United States Patent

Yui et al.

[11] Patent Number: 5,622,549
[45] Date of Patent: Apr. 22, 1997

[54] INK FOR INK JET RECORDING AND INK JET RECORDING PROCESS

[75] Inventors: Toshitake Yui; Eisuke Hiraoka; Yoshiro Yamashita; Yasuharu Endo; Ken Hashimoto, all of Minami-Ashigara, Japan

[73] Assignee: Fuji Xerox Co., Ltd., Tokyo, Japan

[21] Appl. No.: 624,911

[22] Filed: Mar. 27, 1996

[30] Foreign Application Priority Data

Apr. 4, 1995 [JP] Japan .................................. 7-101644

[51] Int. Cl.$^6$ ...................................... C09D 11/02
[52] U.S. Cl. .................... 106/20 R; 106/22 R; 106/20 D
[58] Field of Search ................... 106/20 R, 22 R, 106/20 D

[56] References Cited

U.S. PATENT DOCUMENTS

| | | | |
|---|---|---|---|
| 3,617,185 | 11/1971 | Drautz | 106/27 R |
| 4,308,061 | 12/1981 | Iwahashi et al. | 106/20 R |
| 4,388,115 | 6/1983 | Sugiyama et al. | 106/22 F |
| 4,500,355 | 2/1985 | Shimada et al. | 106/22 K |
| 4,689,078 | 8/1987 | Koike et al. | 106/22 C |
| 5,059,246 | 10/1991 | Yamamoto et al. | 106/22 R |
| 5,137,570 | 8/1992 | Nishiwaki et al. | 106/20 D |
| 5,501,726 | 3/1996 | Yui et al. | 106/20 D |

FOREIGN PATENT DOCUMENTS

| | | |
|---|---|---|
| 0534428 | 3/1993 | European Pat. Off. . |
| 61-55546 | 11/1986 | Japan . |
| 1-263169 | 10/1989 | Japan . |
| 5-093375 | 4/1993 | Japan . |

*Primary Examiner*—Helene Klemanski
*Attorney, Agent, or Firm*—Oliff & Berridge

[57] ABSTRACT

An ink for ink jet recording comprising water, a colorant and a water-soluble organic solvent, in which the water-soluble organic solvent comprises 2,2'-thiodiethanol having a purity of not less than 96% by weight and an electrical conductivity of from not less than $5.0 \times 10^{-4}$ S/m to not more than $5.0 \times 10^{-2}$ S/m as determined in the form of 10 wt % aqueous solution.

8 Claims, No Drawings

INK FOR INK JET RECORDING AND INK JET RECORDING PROCESS

FIELD OF THE INVENTION

The present invention relates to a recording liquid (hereinafter referred to as "ink") for recording on a recording material by an ink jet recording apparatus.

BACKGROUND OF THE INVENTION

The principle of ink jet recording process is that a liquid or molten solid ink is jetted through a nozzle, slit or porous film to perform recording on a paper, cloth, film, etc. As methods for jetting the ink there have been proposed various methods such as electric charge controlling method which in which an ink is jetted utilizing electrostatic attraction force, drop-on-demand method (pressure pulse method) in which an ink is jetted utilizing the oscillation pressure of a piezoelectric element, and heat ink jet method which comprises utilizing a pressure developed by the thermal formation and growth of air bubbles to jet the ink. These methods can provide an image having an extremely high precision.

As an ink for use in such an ink jet recording process there has been known and used an ink comprising various water-soluble dyes or water-dispersible pigments dissolved or dispersed in water or a liquid medium comprising a water-soluble organic solvent.

Studies have been made for improving the above described conventional ink. The ink for use in ink jet printer has been studied from the following standpoint of requirements:

(1) The ink provides a uniform image having a high definition and a high density and being free of feathering;
(2) The ink does not cause clogging at the tip of nozzles due to drying of the ink and thus always exhibits good jetting response and jetting stability;
(3) The ink quickly dries up on a paper;
(4) The ink provides an image having a good fastness;
(5) The ink exhibits a good storage stability over a long period of time; and
(6) The ink is safe and free of offensive smell.

In order to satisfy these requirements, many proposals have heretofore been made.

In particular, many proposals have heretofore been made to use 2,2'-thiodiethanol. For example, JP-A-61-55546 proposes the combination of a specific dye and a solvent containing 2,2'-thiodiethanol. Further, JP-A-1-263169 proposes the combination of C.I. Direct Black 168 and a specific solvent containing 2,2'-thiodiethanol.

With the use of 2,2'-thiodiethanol, an ink for ink jet recording which causes no clogging at the tip of nozzles and quickly dries up on a paper to provide a sharp image free of feathering, can be obtained. However, the resulting ink is disadvantageous in that 2,2'-thiodiethanol is a sulfur-containing compound having a unique offensive odor. When printing is conducted in large quantities at common offices, houses, etc., the odor presents problems.

Further, since 2,2'-thiodiethanol chemically attacks a member with which the ink comes into contact, particularly resins such as polyimide and polysulfone and rubber material, inks containing 2,2'-thiodiethanol have a problem in its preservability, or are disadvantageous in that it exhibits a remarkably deteriorated jetting stability after storage.

The present invention has been achieved to solve the above described problems in conventional techniques.

SUMMARY OF THE INVENTION

An object of the present invention is to solve the above described problems while utilizing the advantages of 2,2'-thiodiethanol, and to provide an ink for ink jet recording which provides a uniform image having a high definition and a high density on a paper without no feathering, causes no clogging at the tip of nozzles due to drying to thereby always exhibit good jetting response and jetting stability, quickly dries up on a paper, provides an image having a good fastness, exhibits a good storage stability over a long period of time, and gives no offensive odor.

As a result of extensive studies, the present inventors found that the above described problems are solved by using 2,2'-thiodiethanol having a purity of not less than 96% and an electrical conductivity of from not less than $5.0 \times 10^{-4}$ S/m to not more than $5.0 \times 10^{-2}$ S/m as determined in the form of 10 wt % aqueous solution as a water-soluble organic solvent for an ink.

That is, the above object of the present invention has been achieved by providing an ink for ink jet recording, which comprises water, a colorant and a water-soluble organic solvent, wherein the water-soluble organic solvent comprises 2,2'-thiodiethanol having a purity of not less than 96% by weight and an electrical conductivity of from not less than $5.0 \times 10^{-4}$ S/m to not more than $5.0 \times 10^{-2}$ S/m as determined in the form of 10 wt % aqueous solution.

The ink for ink jet recording of the present invention may further comprises a moisture-retaining agent, a surfactant, a pH buffer, etc. as optional components.

DETAILED DESCRIPTION OF THE INVENTION

A purified product of commercially available 2,2'-thiodiethanol to a purity of not less than 96% can be used as the 2,2'-thiodiethanol for use in the present invention. However, the 2,2'-thiodiethanol for use in the present invention needs to have an electrical conductivity of from not less than $5.0 \times 10^{-4}$ S/m to not more than $5.0 \times 10^{-2}$ S/m as determined in the form of 10 wt % aqueous solution. The purification of 2,2'-thiodiethanol can be accomplished by distillation under reduced pressure. The distillation under reduced pressure may be carried out by any known method. For example, the purification of 2,2'-thiodiethanol can be accomplished by a process which comprises separating the initial fraction, and then separating the main fraction from the residue, as described in Shinjikken Koza 1 (Maruzen).

The term "purity" as used herein means a value determined from the peak area of gas chromatography. The measurement of the purity of 2,2'-thiodiethanol in the present invention is conducted by means of gas chromatography apparatus (HP5890; manufactured by Hewlett-Packard) with a filler (SP1000; manufactured by Supelco Inc.), nitrogen as a carrier gas and FID (flame ionization detector) as a detector. From the results thus obtained, the main peak area and the-total peak area can be calculated, and the purity of 2,2'-thiodiethanol can be determined therefrom. For the measurement of the electrical conductivity of 2,2'-thiodiethanol, ultrapure water may be used to prepare a 10 wt % solution.

If the purity of 2,2'-thiodiethanol falls below 96 wt %, or if the electrical conductivity of the 10 wt % aqueous solution of 2,2'-thiodiethanol exceeds $5.0 \times 10^{-2}$ S/m, it has a problem in its odor. Further, the resulting ink chemically attacks the portion with which it comes into contact, particularly resin such as polyimide and polysulfone and rubber material, to present a problem in preservability. Further, the jetting stability after prolonged storage is remarkably deteriorated. The electrical conductivity of the 2,2'-thiodiethanol for use in the present invention is preferably low. However, if the electrical conductivity of the 10 wt % aqueous solution of 2,2'-thiodiethanol falls below $5.0 \times 10^{-4}$ S/m, the purification cost is too high, and the dye solubility is deteriorated, to thereby deteriorate the anti-clogging properties of the ink.

The amount of the 2,2'-thiodiethanol for use in the ink of the present invention is preferably from 1 to 40% by weight, more preferably from 5 to 20% by weight based on the total weight of the ink. If the amount of the 2,2'-thiodiethanol in the ink falls below 1% by weight, it presents a problem of anti-clogging properties making it impossible to obtain stable jetting properties. On the contrary, if the amount of the 2,2'-thiodiethanol in the ink exceeds 40% by weight, feathering occurs on the image. Further, the resulting ink undesirably exhibits a deteriorated drying property.

The ink of the present invention may comprise, as a water-soluble organic solvent other than the above described components, a compound which acts as a moisture-retaining agent. Known moisture-retaining agents may be used as the moisture-retaining agent. Examples of thereof include polyhydric alcohols such as ethylene glycol, diethylene glycol, propylene glycol, polyethylene glycol, triethylene glycol, hexylene glycol, glycerin, 1,2,6-hexanetriol and 1,5-pentanediol, polyhydric alcohol derivatives such as ethylene glycol monomethyl ether, ethylene glycol monoethyl ether, ethylene glycol monobutyl ether, diethylene glycol monomethyl ether, diethylene glycol monoethyl ether and diethylene glycol monobutyl ether (butyl Carbitol), basic solvents such as pyrrolidone, N-methyl-2-pyrrolidone, cyclohexylpyrrolidone and triethanolamine, and alcohols such as ethanol, isopropyl alcohol, butyl alcohol and benzyl alcohol.

The water-soluble organic solvent including the 2,2'-thiodiethanol is preferably contained in the ink of the present invention in an amount of from 1 to 40% by weight based on the total weight of the ink.

Examples of the colorant for use in the present invention include various dyes, pigments, colored polymers and oil-soluble dyes containing wax. As the dye there may be preferably used a water-soluble dye. Specific examples of the water-soluble dye include C.I. Direct Black-4, C.I. Direct Black-9, C.I. Direct Black-11, C.I. Direct Black-17, C.I. Direct Black-19, C.I. Direct Black-22, C.I. Direct Black-32, C.I. Direct Black-80, C.I. Direct Black-151, C.I. Direct Black-154, C.I. Direct Black-168, C.I. Direct Black-171, C.I. Direct Black-194, C.I. Direct Black-195, C.I. Direct Blue-1, C.I. Direct Blue-2, C.I. Direct Blue-6, C.I. Direct Blue-8, C.I. Direct Blue-22, C.I. Direct Blue-34, C.I. Direct Blue-70, C.I. Direct Blue-71, C.I. Direct Blue-76, C.I. Direct Blue-78, C.I. Direct Blue-86, C.I. Direct Blue-142, C.I. Direct Blue-199, C.I. Direct Blue-200, C.I. Direct Blue-201, C.I. Direct Blue-202, C.I. Direct Blue-203, C.I. Direct Blue-207, C.I. Direct Blue-218, C.I. Direct Blue-236, C.I. Direct Blue-287, C.I. Direct Red-1, C.I. Direct Red-2, C.I. Direct Red-4, C.I. Direct Red-8, C.I. Direct Red-9, C.I. Direct Red-11, C.I. Direct Red-13, C.I. Direct Red-15, C.I. Direct Red-20, C.I. Direct Red-28, C.I. Direct Red-31, C.I. Direct Red-33, C.I. Direct Red-37, C.I. Direct Red-39, C.I. Direct Red-51, C.I. Direct Red-59, C.I. Direct Red-62, C.I. Direct Red-63, C.I. Direct Red-73, C.I. Direct Red-75, C.I. Direct Red-80, C.I. Direct Red-81, C.I. Direct Red-83, C.I. Direct Red-87, C.I. Direct Red-90, C.I. Direct Red-94, C.I. Direct Red-95, C.I. Direct Red-99, C.I. Direct Red-101, C.I. Direct Red-110, C.I. Direct Red-189, C.I. Direct Red-227, C.I. Direct Yellow-1, C.I. Direct Yellow-2, C.I. Direct Yellow-4, C.I. Direct Yellow-8, C.I. Direct Yellow-11, C.I. Direct Yellow-12, C.I. Direct Yellow-26, C.I. Direct Yellow-27, Direct Yellow-28, C.I. Direct Yellow-33, C.I. Direct Yellow-34, C.I. Direct Yellow-41, C.I. Direct Yellow-44, C.I. Direct Yellow-48, C.I. Direct Yellow-86, C.I. Direct Yellow-87, Direct Yellow-88, C.I. Direct Yellow-135, C.I. Direct Yellow-142, C.I. Direct Yellow-144, C.I. Food Black-1, C.I. Food Black-2, C.I. Acid Black-1, C.I. Acid Black-2, C.I. Acid Black-7, C.I. Acid Black-16, C.I. Acid Black-24, C.I. Acid Black-26, C.I. Acid Black-28, C.I. Acid Black-31, C.I. Acid Black-48, C.I. Acid Black-52, C.I. Acid Black-63, C.I. Acid Black-107, C.I. Acid Black-112, C.I. Acid Black-118, C.I. Acid Black-119, C.I. Acid Black-121, C.I. Acid Black-172, C.I. Acid Black-194, C.I. Acid Black-208, C.I. Acid Blue-1, C.I. Acid Blue-7, C.I. Acid Blue-9, C.I. Acid Blue-15, C.I. Acid Blue-22, C.I. Acid Blue-23, C.I. Acid Blue-27, C.I. Acid Blue-29, C.I. Acid Blue-40, C.I. Acid Blue-43, C.I. Acid Blue-55, C.I. Acid Blue-59, C.I. Acid Blue-62, C.I. Acid Blue-78, C.I. Acid Blue-80, C.I. Acid Blue-81, C.I. Acid Blue-90, C.I. Acid Blue-102, C.I. Acid Blue-104, C.I. Acid Blue-111, C.I. Acid Blue-185, C.I. Acid Blue-254, C.I. Acid Red-1, C.I. Acid Red-4, C.I. Acid Red-8, C.I. Acid Red-13, C.I. Acid Red-14, C.I. Acid Red-15, C.I. Acid Red-18, C.I. Acid Red-21, C.I. Acid Red-26, C.I. Acid Red-35, C.I. Acid Red-37, C.I. Acid Red-52, C.I. Acid Red-249, C.I. Acid Red-257, C.I. Acid Yellow-1, C.I. Acid Yellow-3, C.I. Acid Yellow-4, C.I. Acid Yellow-7, C.I. Acid Yellow-11, C.I. Acid Yellow-12, C.I. Acid Yellow-13, C.I. Acid Yellow-14, C.I. Acid Yellow-19, C.I. Acid Yellow-23, C.I. Acid Yellow-25, C.I. Acid Yellow-34, C.I. Acid Yellow-38, C.I. Acid Yellow-41, C.I. Acid Yellow-42, C.I. Acid Yellow-44, C.I. Acid Yellow-53, C.I. Acid Yellow-55, C.I. Acid Yellow-61, C.I. Acid Yellow-71, C.I. Acid Yellow-76, and C.I. Acid Yellow-79; Projet Cyan 1, Projet Magenta 1, Project Magenta 1T and Projet Yellow 1G (available from Zeneca Inc.); AE-SF VP344, Duasyn Brilliant Red F3BSF VP180 and Bayscript Yellow BG (available from Hoechst AG.); Basacid Black X34 liquid, Basacid Black X38 liquid, Basacid Red 495 liquid, Basacid Blue 752 liquid, Basacid Blue 624 liquid, Basacid Blue 765 liquid, Basacid Yellow SE0840 liquid, Basacid Yellow SE0173 liquid and Basacid Yellow 099 liquid (available from BASF AG.); and Special Black SP liquid and Special Black HF (available from Bayer AG.). These dyes may be used singly or in admixture. These dyes may be toned to a custom color such as red, blue and green besides the four elementary colors, i.e., cyan, magenta, yellow and black.

Further, pigments may also be used as the colorant. Examples of pigments for use in the present invention include carbon black, brilliant carmine BS, lake carmine FB, brilliant fast scarlet, diazo yellow, permanent red R, fast yellow 10G, phthalocyanine blue, blue lake, yellow lake and rhodamine lake.

The content of such a colorant is preferably from 1 to 8% by weight, more preferably from 2 to 6% by weight based on the total weight of the ink. If the content of the colorant falls below 1% by weight, a sufficient image density cannot be obtained. On the contrary, if the content of the colorant exceeds 8% by weight, clogging can easily occur, making it impossible to obtain a stable jet.

In order to further stabilize the dissolution or dispersion state of the dye or pigment, a surfactant, a dispersant, a clathrate compound, etc. may be added to the ink of the present invention. Any of nonionic, anionic, cationic and amphoteric surfactants may be use in the present invention. In particular, a nonionic surfactant is preferred. Examples of the nonionic surfactant include polyoxyethylene nonylphenyl ethers, polyoxyethylene octylphenyl ethers, polyoxyethylene dodecylphenyl ethers, polyoxyethylene alkyl ethers, polyoxyethylene fatty acid esters, sorbitan fatty acid esters, polyoxyethylene sorbitan fatty acid esters and fatty acid alkylolamides. Examples of the anionic surfactant include alkylbenzenesulfonates, alkylphenylsulfonates, alkylnaphthalenesulfonates, formalin condensates of an alkylnaphthalenesulfonate, higher fatty acid salts, sulfuric ester salts of a higher fatty acid ester, sulfonates of a higher fatty acid ester, sulfuric ester salts of a higher alcohol ether, sulfonate of a higher alcohol ether, alkylcarboxylates of a higher alkyl sulfonamide, sulfosuccinic acid ester salts of a higher alkylsulfonamide. Examples of the cationic surfactant include primary, secondary and tertiary amine salts, quaternary ammonium salts and the like. Examples of the amphoteric surfactant include betaine, sulfobetaine, sulfate betaine and the like.

Besides these compounds, acrylic acid, methacrylic acid, maleic acid, a water-soluble polymer comprising the salts of these acid as monomer components, polyethyleneimine, polyamines, polyvinylpyrrolidone, polyethylene glycol, cellulose derivatives, cyclodextrin, macrocyclic amine, crown ethers, urea, acetamide, etc. may be used.

The content of the above described dispersion stabilizing agent is generally from 0.001 to 5% by weight, preferably from 0.005 to 2% by weight, particularly preferably from 0.01 to 1.5% by weight based on the total weight of the ink.

Furthermore, a pH buffer, a mildewproofing agent, a viscosity adjustor, an electrically-conducting agent or the like may be added to the ink of the present invention, as necessary.

The ink jet recording process of the present invention can be carried out by means of an recording apparatus having a head member comprising silicone, glass, ceramics or plastic. The head has a passage and preferably has a heating means provided therein. The heating means has a heating element made of a polysilicone or the like and a protective layer for the heating element. The heating element can be operated at a driving frequency of from 1 to 12 kHz. With the application of such a driving frequency, the ink in the head is heated and jetted as a droplet which is then printed on the recording material.

The mechanism of the operation with the ink for ink jet recording of the present invention is not completely clarified. It is thought that a slight amount of a chemically active residue produced upon synthesis of 2,2'-thiodiethanol exerts adverse effects on various properties. It is thought that the modification of the resin constituting the ink passage as well as the modification of the colorant or other solvents contained in the ink are inhibited by removing such a slight amount of a residue in the present invention.

The present invention will be further described in more detail with reference to the following Examples, but the invention should not be construed as being limited thereto.

EXAMPLES 1–6 AND COMPARATIVE EXAMPLES 1–5

500 g of a commercially available 2,2'-thiodiethanol (available from Wako Pure Chemical Industrial, Ltd.) was charged in a reduced pressure distillation apparatus. The distillation apparatus was then gradually heated over an oil bath with suction by a vacuum pump. After the separation of the initial fraction, the main fraction was picked up. A slight amount of a residue was observed in the flask.

2,2'-Thiodiethanol thus obtained (Sample A) was then measured for purity by means of gas chromatography. As a result, the purity of Sample A was found to be 98%. Further, the electrical conductivity of Sample A in the form of 10 wt % aqueous solution was $8.0 \times 10^{-3}$ S/m. This 2,2'-thiodiethanol was then mixed with the colorant, organic solvent and other components set forth in Table 1 in a proportion as shown in Table 1 with stirring. The mixture was then filtered through a filter having a pore diameter of 0.2 μm under pressure to obtain an ink.

For comparison, comparative inks were prepared in the same manner as described above except that Sample A was replaced with commercially available 2,2'-thiodiethanol (Samples B, C, D, E and G as shown in Table 1; available from Wako Pure Chemical Industrial, Ltd.).

These inks were each subjected to the following tests:
(1) Printing test
For the printing test, a prototype printer (heat ink jet system; 300 dpi) was used to print various Chinese characters. The Chinese character images were relatively evaluated as follows:
G: 8-point Chinese character images were readable
F: 8-point Chinese character images were readable with difficulty but 10-point Chinese character images were readable
P: 10-point Chinese character images were unreadable
(2) Offensive Odor test
80 cc of the ink was measured out in a 100-cc beaker. Arbitrarily selected 10 persons were employed to conduct an organoleptic evaluation of odor of the ink.
G: Not less than 80% of the examiners don't feel uncomfortable with the odor of the ink
F: Not less than 50% of the examiners don't feel uncomfortable with the odor of the ink
P: Not less than 50% of the examiners feel uncomfortable with the odor of the ink
(3) Liquid contact test
The ink was charged in a prototype cartridge integrated with a head. The cartridge was allowed to stand at 30° C. and 50% RH for 6 months, and then subjected to printing test. The printer used in the test (1) was used to subject the ink to 100-sheet printing test at room temperature. The presence of nozzles which had been made impossible to jet was examined. The evaluation was conducted in accordance with the following criteria:
G: All nozzles present no problems during 100-sheet printing
F: Less than 10% of nozzles were made impossible to jet during 100-sheet printing
P: Not less than 10% of nozzles were made impossible to jet during 100-sheet printing
(4) Prolonged storage test
The ink was allowed to stand at 30° C. and 50% RH for 6 months, charged in a cartridge, and then subjected to 100-sheet printing test with the printer used in the test (1). The printed matter was then observed for the occurrence of white line and deletion. The evaluation of these defects were conducted in accordance with the following criterion:
G: No problems occur during 100-sheet printing
F: Not more than 10 defective points occur during 100-sheet printing
P: Not less than 10 defective points occur during 100-sheet printing
The results obtained are shown in Table 1.

EXAMPLE 8

The same commercially available 2,2'-thiodiethanol used in Example 1 was distilled in the same manner as in Example 1, except that the amount of the initial fraction was reduced to prepare Sample F.

Thus obtained Sample F had a purity of 96% and an electrical conductivity in the form of 10 wt % aqueous solution of $4.8 \times 10^{-3}$ S/m.

Using Sample F, an ink was prepared having a composition as shown in Table 1. The ink was subjected to the same test and evaluated as in Example 1.

The results obtained are shown in Table 1.

of nozzles due to drying, to thereby always exhibit good jetting responce and jetting stability.

While the invention has been described in detail and with reference to specific examples thereof, it will be apparent to one skilled in the art that various changes and modifications can be made therein without departing from the spirit and spcope thereof.

TABLE 1

| Example Nos. | 2,2'-Thiodiethanol | | | Kind of coloring material (wt %) | Organic solvent (wt %) | Other additives (wt %) | Results of test | | | |
|---|---|---|---|---|---|---|---|---|---|---|
| | Sample | Purity (wt %) | Electrical conductivity of 10 wt % aq. solution | Amount (wt %) | | | | (1) | (2) | (3) | (4) |
| Example 1 | A | 98 | $8.0 \times 10^{-3}$ | (10) | C.I. Food Black 2 (2.0) | Glycerin (10); Isopropylene alcohol (2) | Ethylene oxide/ propylene oxide copolymer (0.1) | G | G | G | G |
| Example 2 | A | 98 | $8.0 \times 10^{-3}$ | (10) | C.I. Acid Blue 9 (3.0) | Diethylene glycol (10) | Polyoxyethylene alkyl ether (0.1) | G | G | G | G |
| Example 3 | A | 98 | $8.0 \times 10^{-3}$ | (15) | C.I. Acid Red 52 (2.5) | Ethylene glycol (10); Butyl carbitol (5) | Surfinol 465 (0.2) | F | G | G | G |
| Example 4 | A | 98 | $8.0 \times 10^{-3}$ | (5) | C.I. Direct Black 168 (4.0) | 1,5-Pentane diol (10) | BES (0.1); NaOH (0.1) | G | G | G | G |
| Example 5 | A | 98 | $8.0 \times 10^{-3}$ | (10) | C.I. Direct Blue 199 (2.5) | Glycerin (15) Ethanol (3) | — | G | G | G | G |
| Example 6 | A | 98 | $8.0 \times 10^{-3}$ | (10) | C.I. Direct Red 227 (1.5) | Diethylene glycol (10) | — | G | G | G | G |
| Example 7 | A | 98 | $8.0 \times 10^{-3}$ | (8) | C.I. Direct Black 154 (3.0) | — | — | G | G | G | G |
| Example 8 | F | 96 | $4.8 \times 10^{-2}$ | (15) | C.I. Direct Black 195 (2.5) | Glycerin (5) | Urea (6.0) | G | G | G | G |
| Comparative Example 1 | B | 91 | $7.5 \times 10^{-3}$ | (10) | C.I. Direct Black 168 (3.0) | Propylene Glycol (10) | — | G | P | P | P |
| Comparative Example 2 | C | 97 | $6.8 \times 10^{-2}$ | (5) | C.I. Acid Blue 9 (2.0) | Diethylene Glycol (10) | — | G | G | P | P |
| Comparative Example 3 | D | 90 | $6.0 \times 10^{-3}$ | (8) | C.I. Food Black 2 (5.0) | Glycerin (15) | Polyoxyethylene alkyl ether (0.3) | G | P | P | P |
| Comparative Example 4 | E | 96 | $6.0 \times 10^{-2}$ | (10) | C.I. Acid Red 52 (3.5) | Diethylene glycol (10); Butyl carbitol (5) | Polyoxyethylene alkyl ether (0.1) | G | F | P | P |
| Comparative Example 5 | G | 95 | $5.6 \times 10^{-2}$ | (10) | C.I. Direct Yellow 144 (2.0) | Diethylene glycol (10) | — | G | F | P | P |

(Note)
Test (1): Printing test
Test (2): Odor test
Test (3): Liquid contact test
Test (4): Prolonged storage test As described above, an ink for ink jet recording comprising water, a coloring material and 2,2'-thiodiethanol as essential components, wherein the 2,2'-thiodiethanol has a purity of not less than 95% and an electrical conductivity of from not less than $5.0 \times 10^{-4}$ S/m to not more than $5.0 \times 10^{-2}$ S/m as determined in the form of 10 wt % aqueous solution, provides an ink which quickly dries up on a paper, provides an image having a good fastness, has a good storage stability over long period of time and gives no offensive smell. Further, the use of the ink for ink jet recording of the present invention can provide a uniform image having a high definition and a high density free of feathering on a paper. The ink of the present invention causes no clogging at the tip

What is claimed is:

1. An ink for ink jet recording, which comprises water, a colorant and 2,2-thiodiethanol having a purity of not less than 96% by weight and an electrical conductivity of from not less than $5.0 \times 10^{-4}$ S/m to not more than $5.0 \times 10^{-2}$ S/m as determined in the form of 10 wt % aqueous solution.

2. The ink according to claim 1, wherein said ink contains said 2,2'-thiodiethanol in an amount of from 1 to 40% by weight based on the total weight of said ink.

3. The ink according to claim 1, wherein said 2,2'-thiodiethanol has been subjected to a distillation under reduced pressure.

4. The ink according to claim 1, wherein said ink contains said colorant in an amount of from 1 to 8% by weight based on the total weight of said ink.

5. An ink jet recording process which comprises jetting an ink droplet through a head to perform recording, said ink comprising water, a colorant and 2,2'-thiodiethanol having a purity of not less than 96% by weight and an electrical conductivity of from not less than $5.0 \times 10^{-4}$ S/m to not more than $5.0 \times 10^{-2}$ S/m as determined in the form of 10 wt % aqueous solution.

6. The ink jet recording process according to claim 5, wherein said jetting step is conducted with the use of a heating process.

7. The ink according to claim 1, further comprising a moisture-retaining agent.

8. The ink according to claim 7, wherein the total amount of said 2,2'-thiodiethanol and said moisture-retaining agent is from 1 to 40% by weight based on the weight of said ink.

* * * * *